United States Patent
Paige et al.

[15] 3,666,692
[45] May 30, 1972

[54] FLAME RETARDANT POLYPROPYLENE AND POLYURETHANE

[72] Inventors: William P. Paige; Floyd B. Nagle, both of Midland, Mich.

[73] Assignee: The Dow Chemical Company, Midland, Mich.

[22] Filed: Sept. 3, 1970

[21] Appl. No.: 69,441

Related U.S. Application Data

[63] Continuation-in-part of Ser. No. 13,825, Feb. 24, 1970, abandoned.

[52] U.S. Cl................260/2.5 AJ, 260/45.7 S, 260/45.85, 260/45.9 R, 260/45.95, 260/DIG. 24
[51] Int. Cl. ..................................C08g 51/58, C08f 45/58
[58] Field of Search ...............260/2.5 AJ, 45.7 S, 45.85, 260/45.9, 45.95, DIG. 24

[56] References Cited

UNITED STATES PATENTS

| | | | |
|---|---|---|---|
| 2,488,499 | 11/1949 | Moyle | 260/613 |
| 3,372,141 | 3/1968 | Dickerson et al. | 260/45.95 |
| 3,075,944 | 1/1963 | Wick et al. | 260/45.95 |
| 3,330,783 | 7/1967 | Piechota et al. | 260/2.5 |
| 3,491,124 | 1/1970 | Lund et al. | 260/45.95 |

Primary Examiner—Donald E. Czaja
Assistant Examiner—Eugene C. Rzucidlo
Attorney—Griswold and Burdick, Herbert D. Knudsen and C. E. Rehberg

[57] ABSTRACT

The addition of a substituted 2-butene having the general formula

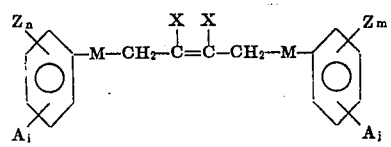

each X independently, forming either the cis or trans isomer, is F, Cl, Br, I or H where not more than one X is H, each M independently is O or S, each Z independently is Cl or Br, each A independently is an inert substituent, such as F, I, methyl, phenyl, hydroxy, methoxy, nitro, carboxy, acetoxy, cyano, amino or sulfo, $n$ and $m$ are integers of 1 to 5 provided that when $n = m = 1$ then each Z and X is Br and M = O
and provided that when one X is H then $n$ and $m$ are integers of 3 to 5, and
$i$ and $j$ are integers of 0 to 2 where $i \leq n - 1$ and $j \leq m - 1$ to a resin of polypropylene or polyurethane makes the resultant resin fire retardant or, in greater concentrations, self-extinguishing according to Underwriters test class 2.

14 Claims, No Drawings

FLAME RETARDANT POLYPROPYLENE AND POLYURETHANE

CROSS-REFERENCE TO RELATED APPLICATIONS

The present application is a continuation-in-part of our prior application Ser. No. 13,825 filed Feb. 24, 1970 now abandoned.

BACKGROUND OF THE INVENTION

A number of compounds related to those of the present invention are known. For example, Moyle in U. S. Pat. No. 2,488,499 teaches the use of 1,4-di(halophenoxy)-2-butenes as modifying agents in plastic compositions. Also Dickerson and Tousignant in U. S. Pat. No. 3,372,141 have employed small quantities of bromoalkenyl bromoaryl ethers in polystyrene to make the polystyrene self-extinguishing.

No commercially feasible fire retardant system for polypropylene has been devised which is completely satisfactory. One known system of making polypropylene fire retardant involves the use of antimony oxide in combination with chlorinated hydrocarbons. The large quantities of the composition required to impart desirable fire retardant properties to the polypropylene are costly and adversely affect the physical characteristics of the polypropylene. In such applications, up to 20 percent of the mixture is required to achieve flame retardancy. As a result, an intensive search has been conducted to overcome the defects of known methods and to find a suitable fire retardant which can be economically employed and not substantially impair the physical properties of the polypropylene. Fire retardants for polyurethane have also been difficult to develop, and none has to date been found to be completely acceptable on a commercial scale.

SUMMARY OF THE INVENTION

According to the present invention, substituted 2-butenes having the general formula

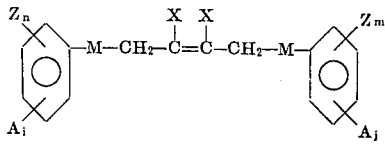

each $X$ independently, forming either the cis or trans isomer, is F, Cl, Br, I or H where not more than one X is H, each M independently is O or S, each Z independently is Cl or Br, each A is an inert substituent, such as F, I, methyl, phenyl, hydroxy, methoxy, nitro, carboxy, acetoxy, cyano, amino or sulfo, $n$ and $m$ are integers of 1 to 5 provided that when $n = m = 1$ then each Z and X is Br and M = O and provided that when one X is H then $n$ and $m$ are integers of 3 to 5, and $i$ and $j$ are integers of 0 to 2 where $i \leq n-1$ and $j \leq m-1$ have been found to be compatible and effective additives for resins of polypropylene or polyurethane to make the resultant polymer fire retardant. Moreover, higher concentrations of one or more of these substituted 2-butenes in the resin may be employed to make the polymer self-extinguishing according to Underwriters Class 2 specifications.

The compounds are prepared by reacting a 1,4-dihalo-2,3-substituted-2-butene with a substituted phenol or thiophenol in a two step reaction in the presence of a base, such as sodium or potassium hydroxide or carbonate. An inert solvent, such as an alcohol or ketone, is usually employed, though a solvent is not necessary. After reaction, the compounds of the invention may be isolated by any ordinary technique such as crystallization.

In the first step of the reaction, a 1,4-dihalo-2-butene of the general formula

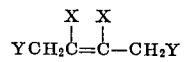

each Y is Cl or Br and
each X is as defined above is reacted in the presence of a base with one equivalent of a substituted benzene which has the general formula

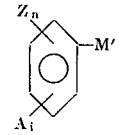

where: A, Z, $i$ and $n$ are as defined above and M' = OH or SH.

Such reaction gives as the predominant product the monosubstituted phenoxy or phenylthio 2-butene compound, although some of the 2-butene compound and disubstituted 2-butene are also present. In the second step of the reaction, an equivalent of a second phenol or thiophenol compound is reacted which has the same general formula as above except that the aromatic substituents $Z_m$ and $A_j$ replace $Z_n$ and $A_i$. Such reaction gives as the predominant product the compound of the invention. Of course, for compounds having the identical groups on either end, i.e., where $M = M$, $Z_n = Z_m$ and $A_i = A_j$, two moles of the substituted benzene per mole of the 2-butene would be reacted in a single step.

Representative examples of various compounds covered by the generic structure above include essentially three parts: the first phenoxy or phenylthio end, the substituted 2-butenylene radical in the middle and the second phenoxy or phenylthio end. Both the first and second phenoxy or phenylthio parts of the molecule can be selected from the same class so only two designations are necessary: one for the two substituted benzene radicals and the other for the 2-butenylene radical. Since the substituents on the aromatic portions may be in any position without materially affecting the fire retardancy, in the designation of the compounds, the numerical position will not be given because the substituents may be arranged in any manner on the five available positions. Reference numbers will be given for these substituted benzene radicals so that they may be easily combined to show specific examples of compounds covered by the generic formula. Representative examples of such radicals include: brominated phenoxy radicals, such as (1) bromophenoxy, (2) dibromophenoxy, (3) tribromophenoxy, (4) tetrabromophenoxy, (5) pentabromophenoxy, (6) dibromomethylphenoxy, (7) tribromodimethylphenoxy, (8) tetrabromophenylphenoxy, (9) fluorodibromophenoxy, (10) diiodotribromophenoxy, (11) hydroxytribromophenoxy, (12) methoxytetrabromophenoxy, (13) nitrodibromophenoxy, (14) dinitrotribromophenoxy, (15) carboxydibromophenoxy, (16) cyanotribromophenoxy, (17) aminotetrabromophenoxy, and (18) sulfotetrabromophenoxy; the brominated phenylthio radicals, such as those corresponding to the phenoxy radicals above where the oxy linkage is replaced by the thio linkage, such radicals being designated by the number of the bromophenoxy radical prime, i.e., $N'$; the chlorinated phenoxy radicals, such as those representative radicals for the bromine compounds except that all bromines are replaced by chlorines, such radicals being designated by the number of the bromophenoxy radical double prime, i.e., $N''$; the chlorinated phenylthio radicals, such as those of the bromophenoxy radicals above where the oxy linkage is replaced by a thio linkage and all bromines are replaced by chlorines, such radicals being represented by the number of the phenoxybromo radical triple prime, i.e., $N'''$; mixed chlorobromophenoxy radicals, such as (19) chlorobromophenoxy, (20) chlorodibromophenoxy, (21) dichlorotribromophenoxy, (22) chlorotribromomethylphenoxy, (23) trichlorobromophenoxy, (24) nitrochlorotribromophenoxy, and (25) aminochlorodibromophenoxy; and the mixed chlorobromophenylthio radicals, such as those represented by numbers 19–25 where the oxy is replaced with thio, such radicals being designated by the number prime, i.e., N'.

The second radical to be exemplified, the 2-butenylene radical, only differs in the 2,3-substitution. The substituents in the 2 and 3 position, using alphabetical designation for each pair, are: (a) Br, Br; (b) Br, H; (c) Br, Cl; (d) Br, F; (e) Br, I; (f) F, F; (g) F, Cl; (h) F, I; (i) F, H; (j) Cl, Cl; (k) Cl, I; (l) Cl, H; (m) I, I and (n) I, H.

Combining the phenoxy and phenylthio radicals with the 2-butenylene radicals by number and letter designation representative compounds exemplifying the general formula of the invention are: those having symmetrical end radicals, such as 1(a)1 which denotes 1,4-bis(bromophenoxy)-2,3-dibromo-2-butene; 2'(c) 2'; 3'' (b) 3''; 4''' (d) 4'''; 5 (e) 5; 20 (f) 20; 6' (g) 6'; 7'' (h) 7''; 8''' (i) 8'''; 9 (j) 9; 10' (k) 10'; 11'' (l) 11''; 12''' (h) 12'''; 13 (m) 13; 14 (a) 14; 15' (c) 15'; 16'' (b) 16''; 17''' (d) 17'''; 18 (e) 18; 19' (f) 19'; 21 (g) 21; 22' (h) 22'; 23 (j) 23; 24' (i) 24' and 25 (k) 25; and those having unsymmetrical radicals such as 1(m) 25 which denotes 1-bromophenoxy-4-aminochlorodi-bromophenoxy-2,3-diiodo-2-butene; 3' (n) 24'; 3'' (l) 23; 4''' (k) 22'; 5 (j) 21; 7' (i) 20'; 6 (h) 19; 8' (g) 18'''; 9 (f) 17'; 10 (e) 16''; 1 (d) 15'''; 12 (c) 14'; and 12 (a) 13'''. All these compounds designated represent suitable fire retardant compounds. In the same manner as shown above, other combinations of these numbers can be chosen, and the resulting compound is examined in the light of the general formula to determine whether the compound is covered by the invention. All such compounds that meet the criteria of the general formula are desirable fire retardants and can be prepared by the method described above.

The compounds produced by such reaction may be any of the compounds of the general formula above. Preferred compounds are those where M is oxygen. Also preferred are compounds wherein at least one and preferably both X are Br and those compounds containing aromatic bromine, i.e., where Z is Br because of their effective fire retardant characteristics. Highly desirable are compounds where $n = 3$ to 5. Compounds of the general formula containing about 6 to about 10 bromine atoms are also preferred because of their special effectiveness, and of special interest because of effectiveness and ease of preparations are 1,4-bis(tribromophenoxy)-2,3-dibromo-2-butene, i.e., wherein each X and each Z is Br, $n = m = 3, i = j = O$ and $M = $ oxygen; 1-(tribromophenoxy)-4-(pentabromophenoxy)-2,3-dibromo-2-butene, i.e., where each X and Z is Br, $n = 5, i = j = O$ and $M = $ oxygen; 1,4-bis[dibromonitrophenoxy-2,3-dibromo-2-butene, i.e., where each X and Z is Br, $m = n = 2$, each $A = NO_2$, $i = j = 1$ and $M = $ oxygen; and 1,4-bis[dimethyltribromophenoxy]-2,3-dibromo-2-butene, i.e., where each X and Z is Br, $m = n = 3$, and each A is methyl. From the economic view point, compounds containing symmetrical aromatic groups are preferred, i.e., where each M is the same, each $Z_n = $ each $Z_m$ and each $A_i = $ each $A_j$.

The essential feature of the present invention, is the addition of the fire retardant compounds to resins of polypropylene or polyurethane and the resulting fire retardant polymers. Any resin containing a major amount of polypropylene or polyurethane in which the additives are compatible may be made fire retardant in the invention, with resins containing more than 80 percent by weight of polypropylene or polyurethane being preferred and essentially unmodified polypropylene and polyurethane being of special interest.

Homopolymers and copolymers of propylene are well known and readily available on a commercial scale. Homopolymerized polypropylene is usually sold in the form of isotactic polyropylene although it is also available in the atactic form. The polypropylene may be in any form such as solids, fibers and the like. Copolymers of propylene that may be made fire retardant include those prepared by copolymerization of propylene with alpha olefins, such as ethylene and butylene, and with other ethylenically unsaturated monomers, such as styrene, acrylonitrile, acrylamide, acrylic acid, butadiene and the like. Copolymers of propylene and ethylene are preferred, with copolymers containing at least 80 percent by weight propylene and homopolymer polypropylene being especially preferred because of the desirable self-extinguishing characteristics exhibited at relatively low additive levels. Such polymers and copolymers of propylene are referred to herein as "polypropylene".

The additives of the invention are physically incorporated into the polypropylene. This is conveniently accomplished by melting and mixing the fire retardant additive and the polypropylene prior to extrusion or molding. As an alternative, the polypropylene and the fire retardant additive can be combined in the solid state by mechanically mixing the two solids. This technique, however, is less preferred because of the lack of uniformity in the distribution of the fire retardant. An addition technique of special commercial interest for polypropylene is the preparation of a concentrate of the fire retardant in polypropylene and the addition of this concentrate to more polypropylene. Such concentrates may include in addition to the fire retardant and polypropylene, any other desirable components, such as stabilizers or color.

The fire retardant added to resins containing polypropylene may contain various stabilizers, such as tridecyl phosphite, barium-cadmium soaps and organo tin compounds, or other known fire retardants, such as antimony oxide, chlorinated hydrocarbons and peroxides. Although stabilizers are generally unnecessary with the pure fire retardants of the invention, commercial grades of the fire retardant sometimes contain impurities which cause discoloration at high temperatures. With proper stabilization or purified additive, however, fire retardant polypropylene may be molded or extruded at temperatures above 200°C. without degradation or discoloration.

The fire retardant additives of the present invention are also useful in polyurethane to form a fire retardant urethane polymer. Although the additives of the invention are useful in any polyurethane, the use of the additives in non-foamed polyurethane and in rigid polyurethane foams is of special interest because of the smaller amounts of the fire retardant required. The additives of the invention may be incorporated into urethane elastomers, coatings and flexible or rigid foams of high, intermediate or low density. The reactants for these urethane products abound in he market and are readily available on a commercial scale.

The addition of the fire retardant to the polyol or the isocyanate prior to the preparation of the polyurethane is most convenient and assures essentially uniform distribution of the fire retardant throughout the polyurethane. In the preparation of the polyurethane, the fire retardants do not interfere with the reaction and are ordinarily incorporated physically rather than chemically into the urethane because most of the additives have no functionally reactive sites. An exception to this, however, may be observed when using compounds containing substituents with active hydrogens because the hydrogen is reactive with the isocyanate.

ALthough the compounds of the invention are effective fire retardants in polyurethanes when used alone, other known additives may be incorporated into the polyurethane in addition to or partial substitution for these fire retardants. Representative examples of other compatible additives include metal ammonium phosphates, antimony oxide, a peroxide or another brominated substrate.

The compounds of the invention may suitably be added to these polypropylene and polyurethane resins in amounts sufficient to give the desired degree of fire retardancy. The amount of the fire retardant added to the resin may vary widely as different polymers and shapes are employed and as different fire retardant characteristics are desired. Polypropylenes and non-foamed polyurethanes require relatively small amounts of the fire retardants, whereas rigid polyurethane foams require more, and flexible polyurethane foams require the greatest amount of fire retardant. Generally additive levels of about 0.1 to 20 percent by weight of polypropylene, solid polyurethane or rigid polyurethane give adequate protection, with amounts of about 1 to bout 10 percent being preferred.

A special advantage of the fire retardants of the invention is their effectiveness in both low temperature flames, such as that of a match or burning cloth, and high temperature flames, such as that of a Bunsen burner. When the fire retardant resin is subject to either type of burning, the fire retarding mechanism of these compounds acts to control or reduce the flame.

SPECIFIC EMBODIMENTS

Example 1

A general purpose polypropylene was mixed with 1,4-bis(2,4,6-tribromophenoxy)-2,3-dibromo-2-butene and a phosphite chelator sold under the trade name Mark 308 by the Argus Chemical Company to give a polypropylene resin having the composition by weight: 96.5 percent polypropylene, 3 percent of the 2-butene compound and 0.5 percent of the chelator. The mixture was ground and molded into a standard Underwriters Laboratory burning test bar according to the test set forth in UL subject 94. These test bars were ignited with either a Bunsen burner or a match and were found to be self-extinguishing class 2, whereas the bars containing no additive burned readily.

Example 2.

In the same manner as shown by Example 1, propylene was copolymerized with 4 percent ethylene, and 10 percent of the 2-butene compound of Example 1 was added. The resulting polymer was tested with a match and a Bunsen burner and found to be self-extinguishing class 2.

Example 3

A polyurethane composition was prepared by reacting by weight 42.9 percent of a N-2-hydroxyethyl-N,N',N'-tris(2-hydroxypropyl)ethylenediamine, 52.8 percent of a poly-methylene-polyphenylenepolyisocyanate sold under the trade name PAPI, and 4.3 percent of the butene compound of Example 1. The fire retardant was dispersed in the isocyanate using a high speed blender for 2 minutes, and the polyol and isocyanate were mixed using vigorous agitation. The resultant rigid foam structure was then sliced into two burning test specimens ¼ inch by ½ inch by 3 inches for burning tests. The test specimens were found to be self-extinguishing class 2 when tested with either a match or a Bunsen burner, whereas those samples without additive were consumed by the flame.

Example 4

In the same manner as described by Example 3, a polyurethane composition was prepared by reacting by weight 41.2 percent of the polyol, 50.6 percent of the isocyanate and 8.2 percent of the fire retardant of Example 1. The test specimens were examined by the burning tests of the examples above and were found to be very self-extinguishing and almost nonburning with both the match and a Bunsen burner test.

Example 5

A concentrate of the butene fire retardant compound of Example 1 in polypropylene was produced having the following composition by weight: 50 percent of the butene compound, 40 percent of the polypropylene and 10 percent of tridecyl phosphite. These three components were mixed and melted. The composition produced was determined to be a useful concentrate or master batch of fire retardant that could be added to polypropylene or other thermoplastic polymer to make a fire retardant resin.

In the same manner as described by the examples above, other fire retardants of the invention are employed in polypropylene or polyurethane in amounts of about 0.1 to about 20 percent to make the resulting resin at least fire resistant, and in some cases self-extinguishing.

We claim:

1. A resin of polypropylene or polyurethane containing from about 0.1 to about 20 percent by weight of a fire retardant additive of the formula

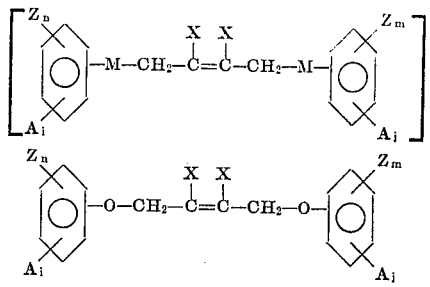

each X independently, forming either the cis or trans isomer, is F, Cl, Br, I or H where not more than one X is H, each Z independently is Cl or Br, each A independently is an inert substituent, such as F, I, methyl, phenyl, hydroxy, methoxy, nitro, carboxy, acetoxy, cyano, amino or sulfo, $n$ and $m$ are integers of 1 to 5 provided that when $n=m=1$ then each Z and X is Br and provided that when one X is H then n and m are integers of 3 to 5, and $i$ and $j$ are integers of 0 to 2 where $i \leq n-1$ and $j \leq m-1$.

2. The resin of claim 1 wherein in the fire retardant additive at least one $X$ is Br.

3. The resin of claim 2 wherein in the fire retardant additive both $X$ are Br.

4. The resin of claim 1 wherein in the fire retardant additive each Z is Br.

5. The resin of claim 1 wherein in the fire retardant additive $n=3$ to 5.

6. The resin of claim 1 wherein the additive contains 6 to 10 bromine atoms.

7. The resin of claim 1 wherein in the fire retardant additive each X and each Z is Br, $n=m=3, i=j=0$.

8. The resin of claim 1 wherein in the fire retardant additive each X and Z is Br, $n=3, m=5, i=j=0$.

9. The resin of claim 1 wherein in the fire retardant additive each X and Z is Br, $m=n=2$, each $A=NO_2, i=j=1$.

10. The resin of claim 1 wherein in the fire retardant additive each X and each Z are Br, $m=n=3$, each $A$ is methyl, $i=j=2$.

11. The resin of claim 1 wherein each each $Z_n$ = each $Z_m$ and each $A_i$ = each $A_j$.

12. The resin of claim 1 wherein the resin is polypropylene.

13. The resin of claim 1 wherein the resin is polyurethane.

14. The resin of claim 1 containing 1 to 10 percent by weight of the fire retardant.

* * * * *

UNITED STATES PATENT OFFICE
CERTIFICATE OF CORRECTION

Patent No. 3,666,692                    Dated  30 May 1972

Inventor(s)  William P. Paige and Floyd B. Nagle

It is certified that error appears in the above-identified patent and that said Letters Patent are hereby corrected as shown below:

Column 3, line 47, delete "n = 5," and insert --n = 3, m = 5,--.

Column 4, line 44, delete "he" and insert --the--.

Column 5, line 2, change "bout" to --about--.

Column 6, delete the formula between lines 11 and 17.

Column 6, line 55, delete the second occurance of "each".

Signed and sealed this 5th day of December 1972.

(SEAL)
Attest:

EDWARD M. FLETCHER, JR.                ROBERT GOTTSCHALK
Attesting Officer                      Commissioner of Patents